United States Patent
Azema

(10) Patent No.: US 6,232,011 B1
(45) Date of Patent: May 15, 2001

(54) PRESSURE SENSITIVE CIRCUIT BREAKER

(75) Inventor: Tadamitsu Azema, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/187,670

(22) Filed: Nov. 5, 1998

(30) Foreign Application Priority Data

Nov. 20, 1997 (JP) .................................. 9-320022

(51) Int. Cl.[7] ............................................. H01M 2/12
(52) U.S. Cl. ................................ 429/61; 429/57; 429/90
(58) Field of Search ........................... 429/61, 7, 57, 429/90, 56

(56) References Cited

U.S. PATENT DOCUMENTS

| | | |
|---|---|---|
| 4,943,497 | 7/1990 | Oishi et al. . |
| 5,532,075 * | 7/1996 | Alexandres et al. . |
| 5,705,290 * | 1/1998 | Azema . |
| 5,766,790 * | 6/1998 | Kameishi et al. . |

* cited by examiner

*Primary Examiner*—John S. Maples
(74) *Attorney, Agent, or Firm*—Brinks Hofer Gilson & Lione

(57) ABSTRACT

The pressure sensitive circuit breaker comprises a metallic battery lid having a hole, an insulator formed with a cylindrical portion having a bore which cylindrical portion is inserted into the hole, a metallic rivet inserted through the cylindrical portion of the insulator, an insulating holder having a through hole for insertion therein of the rivet, and an electrically conductive connecting portion formed around an outer surface of the through hole of the holder and having an exposed surface with a space present on the back side thereof, the rivet having a tongue portion on the side opposite to a caulking portion thereof, with a terminal portion being bonded to the tongue portion by welding.

4 Claims, 12 Drawing Sheets

PRESSURE SENSITIVE CIRCUIT BREAKER

BACKGROUND OF THE INVENTION

1. Field of the Invention

The present invention relates to a pressure sensitive circuit breaker (hereinafter referred to as "PSCB") to be used for ensuring the safety of a storage battery such as a secondary battery capable of being regenerated by re-charging. Particularly, the invention is concerned with a PSCB having a rectangular lid.

2. Description of the Related Art

If a storage battery (a secondary battery) of this type is continued to be charged even after completion of charging or if it is charged with an electric current larger than a predetermined current, there may arise a problem such that some trouble occurs in the battery, with evolution of gas therein, increase of pressure and temperature in the battery, swelling of the battery, oozing of electrolyte caused by cracking, and adverse effect on devices installed in the battery. Even if the result is not to such an extent, if the battery is continued to be used in such a state, swelling of the battery will proceed and may cause cracking or burst. Thus, as to a storage battery which has undergone some trouble, it is necessary to stop the use thereof immediately.

Among the devices for which the reduction of size has been required recently, there are many devices which are characterized by their small wall thickness. With this tendency, square or rectangular batteries have come to be used. Also in this case, reduction of thickness remains to be solved. On the other hand, in reply to a keen demand for safety, it is necessary to incorporate a safety valve and a current cut-off mechanism in such devices.

In a conventional PSCB referred to above, when the internal pressure of a storage battery increases due to some abnormal chemical change of a power generating element, the increased pressure acts on a cut-off diaphragm, so that the diaphragm is lifted and an electric conduction passage which connects a central projection and a lead through a lead stripper plate is stripped or broken. As the pressure further increases and reaches a predetermined level, a thin-walled portion of the safety valve is broken and a gas present in a battery case and having the increased pressure is released to the exterior through a hole formed in the lid.

In many of circular batteries, a single member is used for both diaphragm and safety valve.

In such a secondary battery, members incorporating the above mechanisms are laminated together and a junction and a conductive portion for connection between the interior and the exterior are rendered integral and sealed hermetically by caulking with use of a rivet for example.

According to the prior art described above, rivet caulking or fusion-bonding with laser or ultrasonic wave has been used for making integral and seal hermetically such a member as a lid. In this case, however, a strong force is exerted on a flat head of the rivet, resulting in that the head surface of the rivet, which is brought into pressure contact with the lid or a gasket, is flawed or crushed and hence deteriorates the sealability.

Another problem has been encountered such that the member caulked by the rivet creeps due to a change with the lapse of time and thus the sealability and a long-term stability of an electrically contacted state are poor.

Moreover, aluminum material is usually employed on the positive electrode side, so if the rivet used is also made of aluminum, it follows that the aluminum rivet and an internal terminal made of aluminum are connected together and hence the connected state becomes unstable. More particularly, since the gasket is formed of a synthetic resin such as PP, the rivet caulked portion is apt to become loose with the lapse of time, so if the connection is made by rivet caulking, there occurs a gap between the rivet and the internal terminal. As a result, not only the connected state becomes unstable, but also an aluminum oxide film is formed on the interface, resulting in increase of the resistance value and giving rise to a more stable condition.

If welding is adopted for fixation, a damage is done thermally to the caulking portion and it is necessary to ensure a certain degree of thickness. Besides, it is difficult to ensure a receptacle portion for the bonding, and deformation is apt to occur.

SUMMARY OF THE INVENTION

It is the first object of the present invention to provide a PSCB wherein a rivet has a tongue portion on the side opposite to a caulking portion thereof, with an internal terminal being connected to the tongue portion, thus reducing damage to the caulking portion and improving sealability and a long-term stability of an electrically contacted state.

It is the second object of the present invention to provide a PSCB wherein the tongue portion projects in a direction parallel to a lid, thus permitting the reduction in thickness of the connected portion and the reduction of space.

It is the third object of the present invention to provide a PSCB wherein an annular projection of a flange portion of the rivet bites into a member to be caulked, whereby sealing is effected positively.

It is the fourth object of the present invention to provide a PSCB wherein an exposed surface of an electrically conductive connecting portion is deformed by caulking toward a space formed on the back side thereof, the connecting portion being formed around an outer surface of a through hole of the holder, so that a force is imposed on the caulked portion at all times to eliminate the fear of loosening of the rivet even if there occurs a change with the lapse of time.

The above first object is attained by a first means comprising a metallic battery lid having a hole, an insulator having a cylindrical portion to be inserted into the hole, the cylindrical portion having a bore, a metallic rivet to be inserted through the cylindrical portion of the insulator, an insulating holder having a through hole for insertion therein of the rivet, and an electrically conductive connecting portion formed around an outer surface of the through hole of the holder and having an exposed surface with a space present on the back side thereof, the rivet having a tongue portion on the side opposite to a caulking portion, with an internal terminal being connected to the tongue portion.

The above second object is attained by a second means in combination with the first means wherein the tongue portion projects in a direction parallel to the lid.

The above third object is attained by a third means in combination with the first means wherein the surface of a flange portion of the rivet which surface comes into contact with a member to be caulked is formed with an annular projection.

The above fourth object is attained by a fourth means in combination with the first means, wherein the exposed surface of the connecting portion is deformed toward the back-side space thereof by caulking.

DETAILED DESCRIPTION OF A PREFERRED EMBODIMENT

Figure 1:
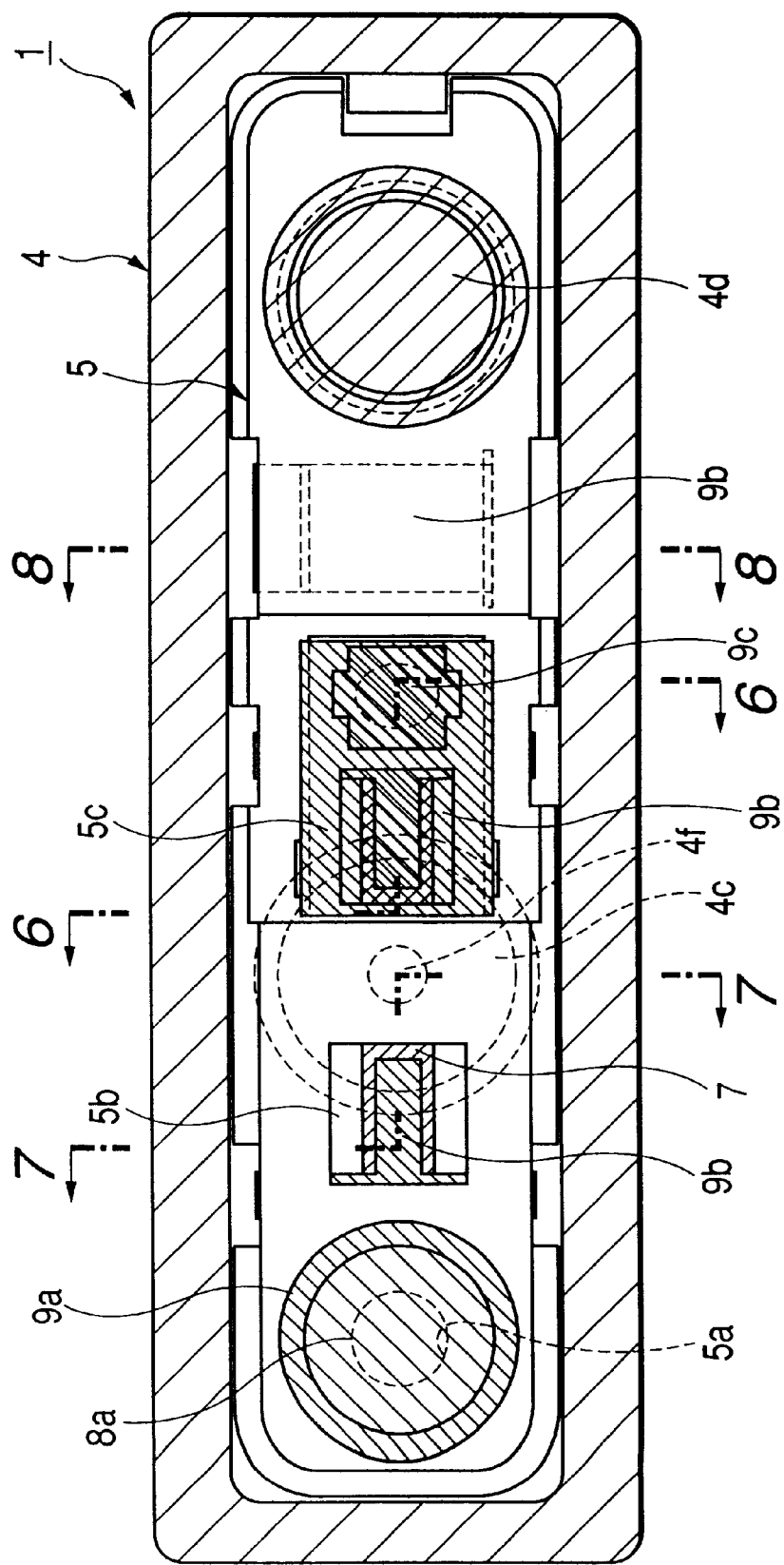
FIG. 1 is a transverse sectional view of a PSCB according to an embodiment of the present invention.
Figure 2:
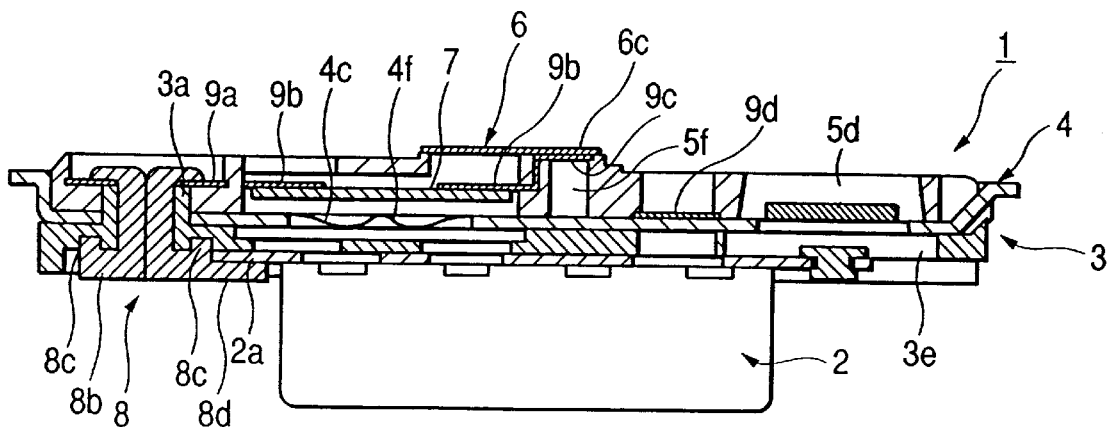
FIG. 2 is a longitudinal sectional view of the PSCB.
Figure 3:
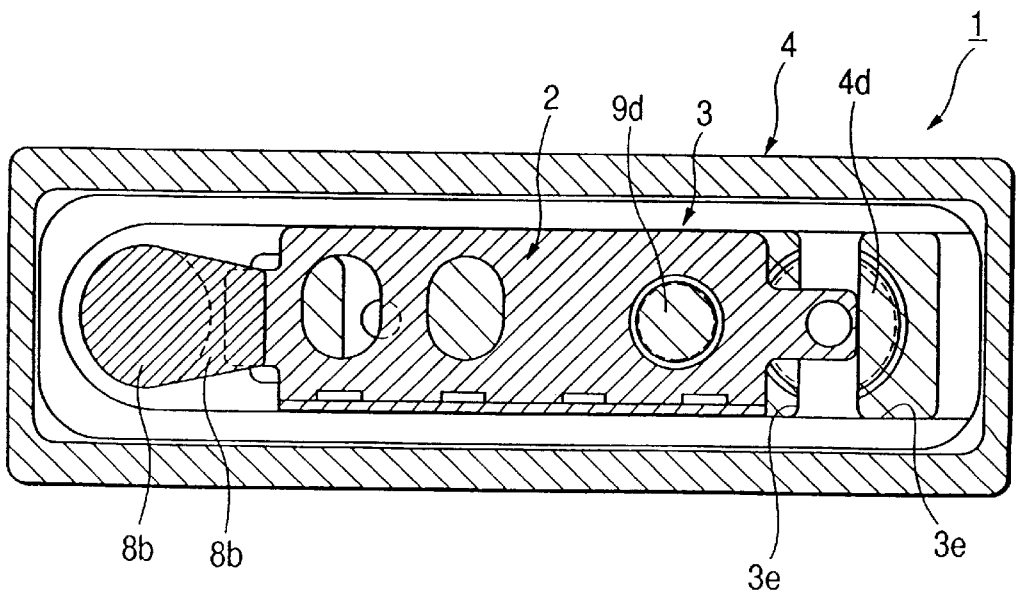
FIG. 3 is a transverse sectional view of the PSCB.
Figure 4:
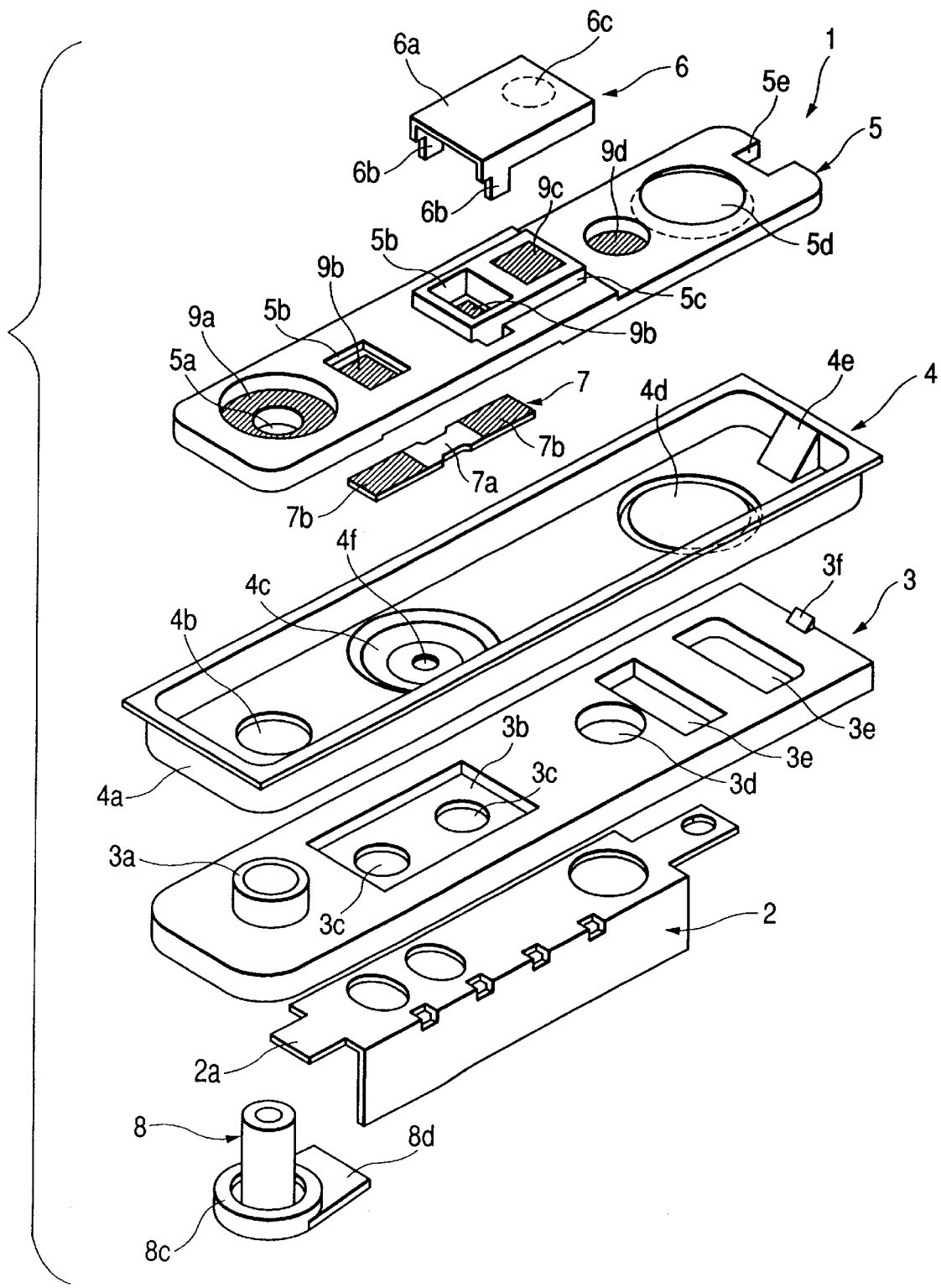
FIG. 4 is an exploded perspective view of the PSCB.
Figure 5:
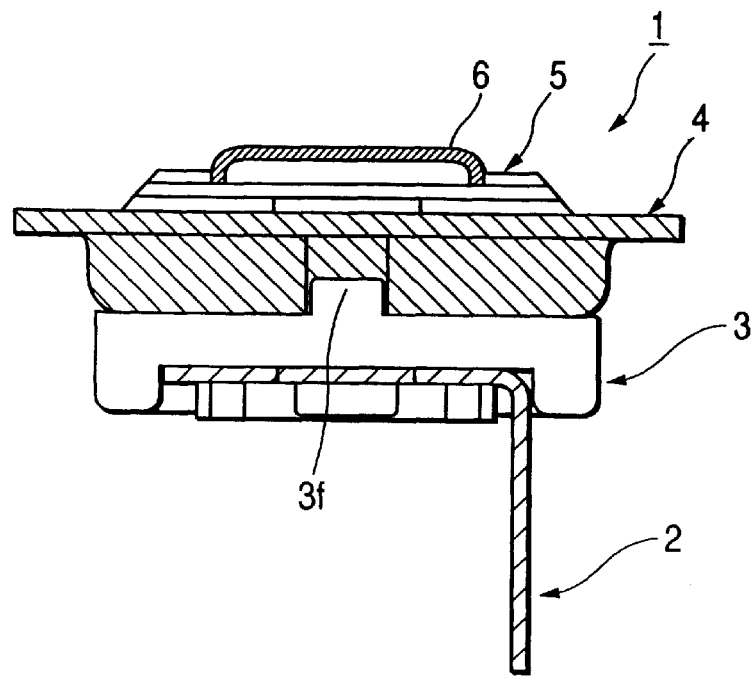
FIG. 5 is a side view of the PSCB.
Figure 6:
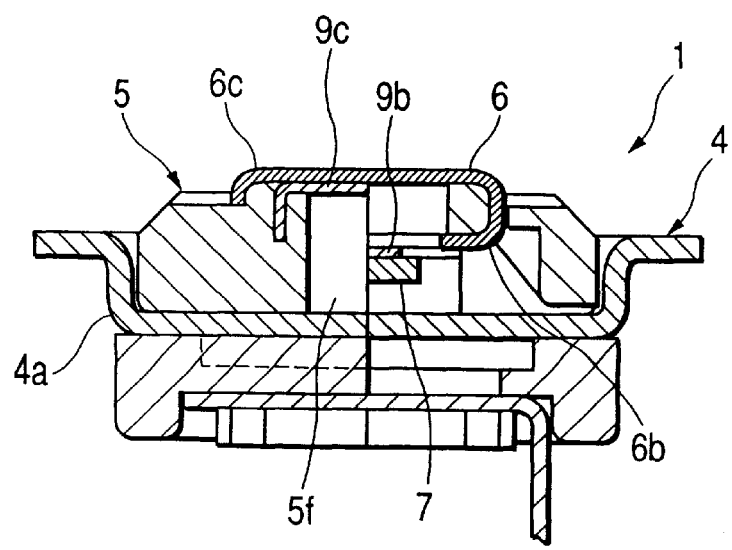
FIG. 6 is a longitudinal sectional view taken along line 6—6 in FIG. 1.
Figure 7:
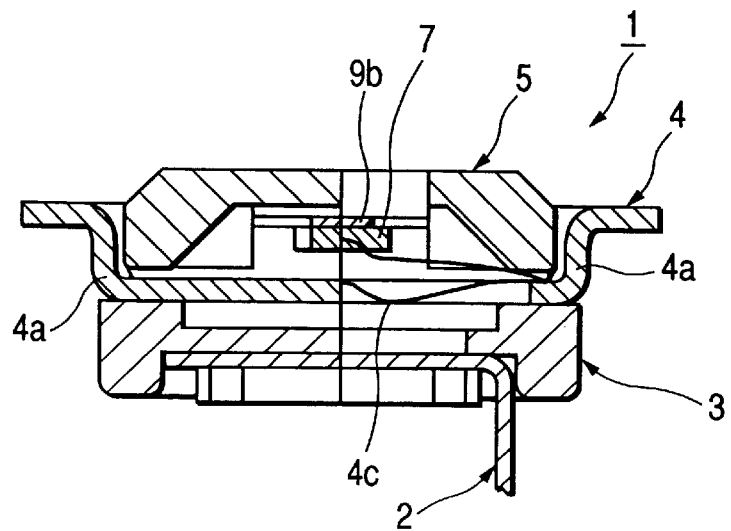
FIG. 7 is a longitudinal sectional view taken along line 7—7 in FIG. 1.
Figure 8:
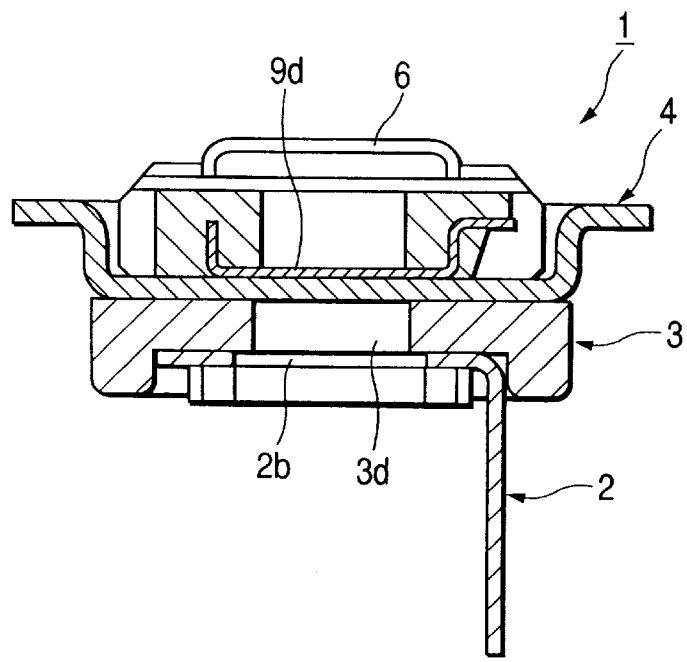
FIG. 8 is a longitudinal sectional view taken along line 8—8 in FIG. 1.
Figure 9:
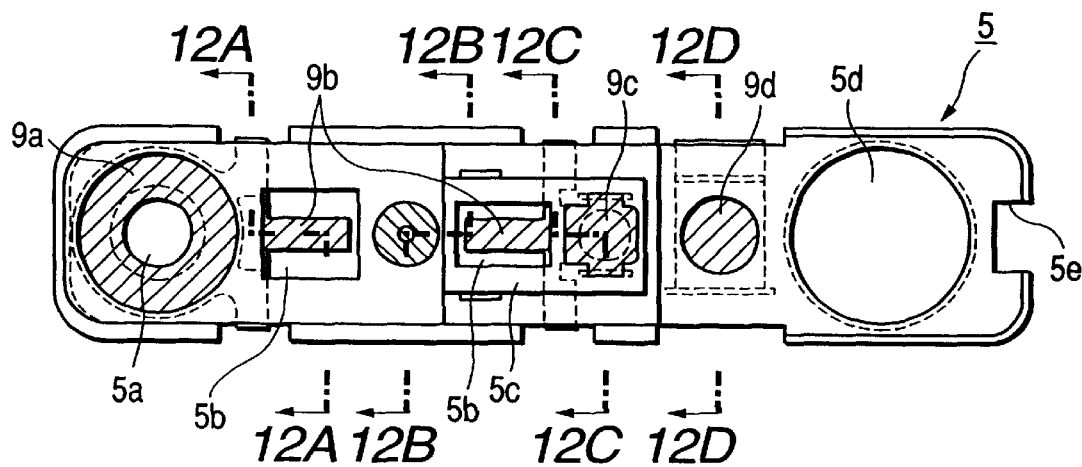
FIG. 9 is a bottom view of a holder.
Figure 10:
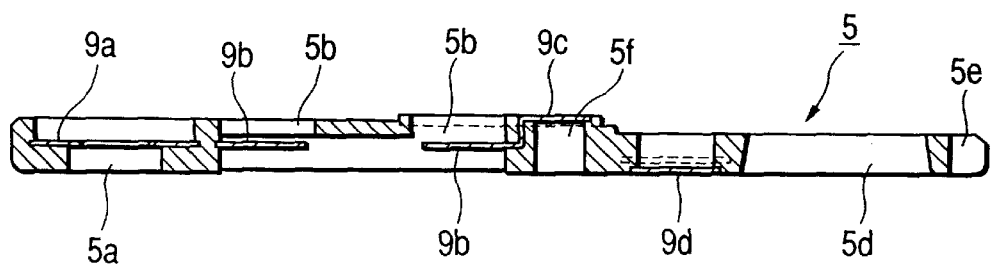
FIG. 10 is a longitudinal sectional view of the holder.
Figure 11:
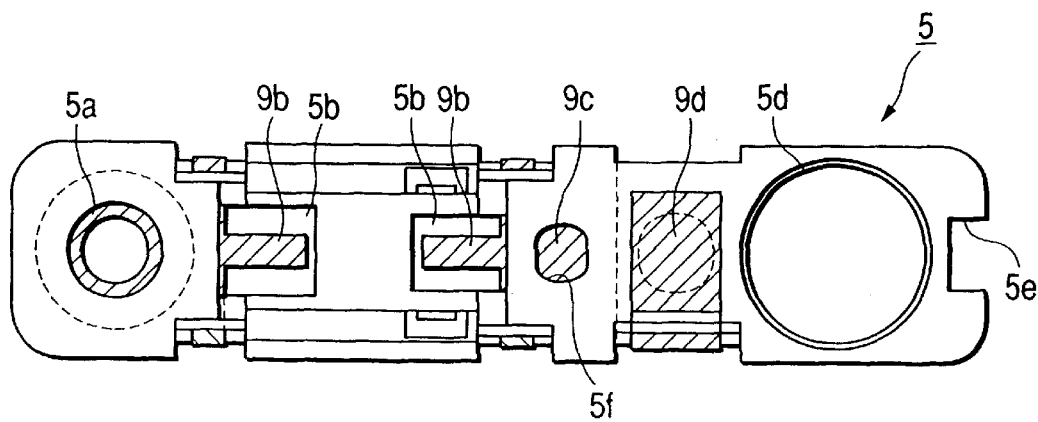
FIG. 11 is a plan view of the holder.
Figure 12A:
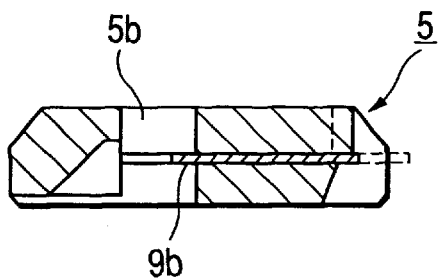
FIGS. 12A, 12B, 12C and 12D are longitudinal sectional views taken along lines 12A—12A, 12B—12B, 12C—12C and 12D—12D, respectively.
Figure 12B:
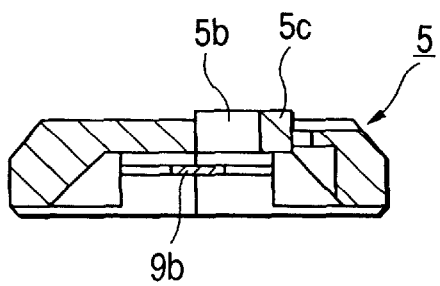
Figure 12C:
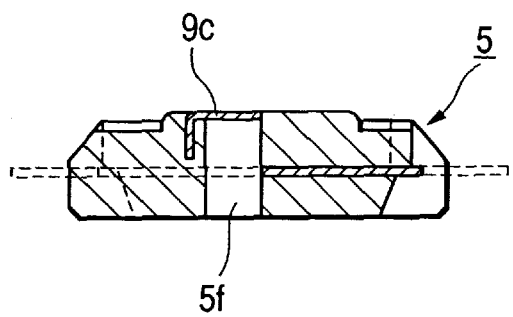
Figure 12D:
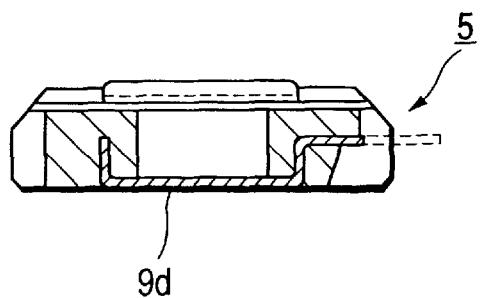
Figure 15:
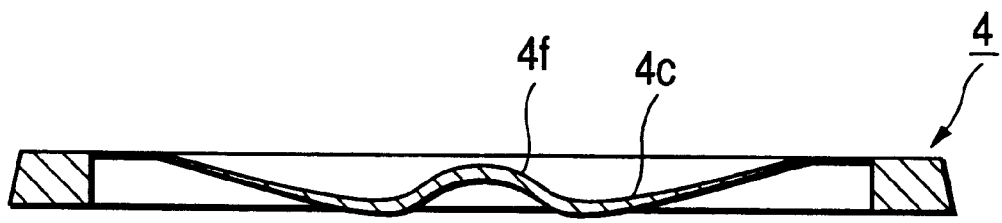
FIG. 15 is an explanatory view showing a diaphragm portion of the lid on a larger scale.
Figure 16:
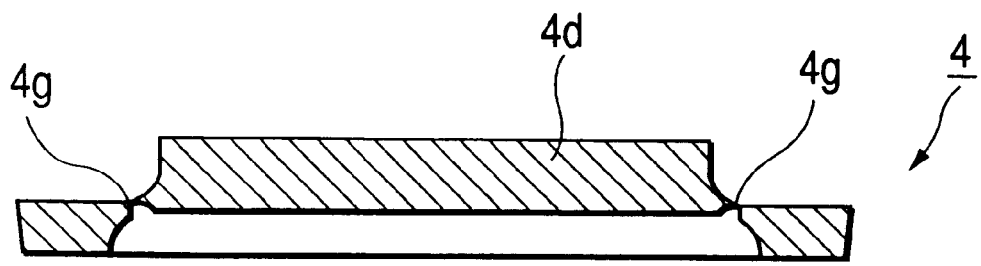
FIG. 16 is an explanatory view showing a safety valve portion of the lid on a larger scale.
Figure 17C:
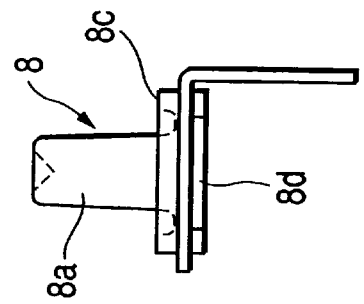
FIGS. 17A, 17B and 17C are a plan view, a front view and a right side view, respectively, showing a connected state of a rivet and a terminal portion.
Figure 17A:
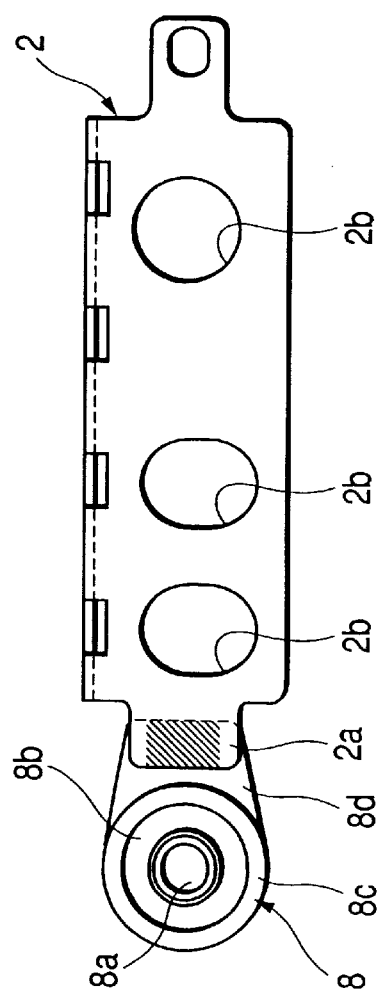
Figure 17B:
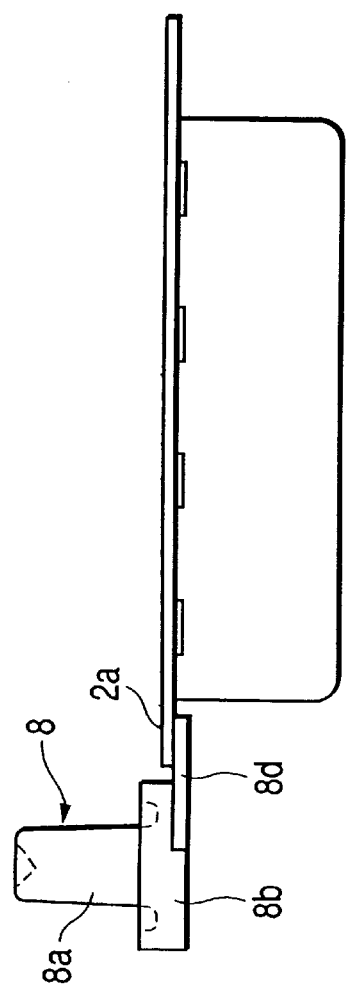
Figure 18A:
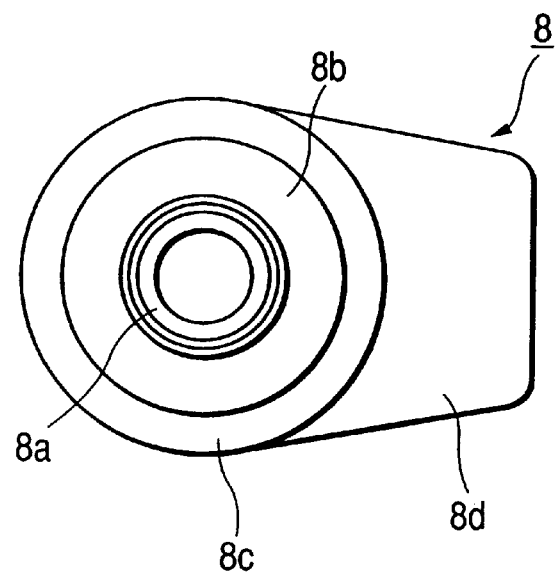
FIGS. 18A and 18B are a plan view and a longitudinal sectional view, respectively, of the rivet.
Figure 18B:
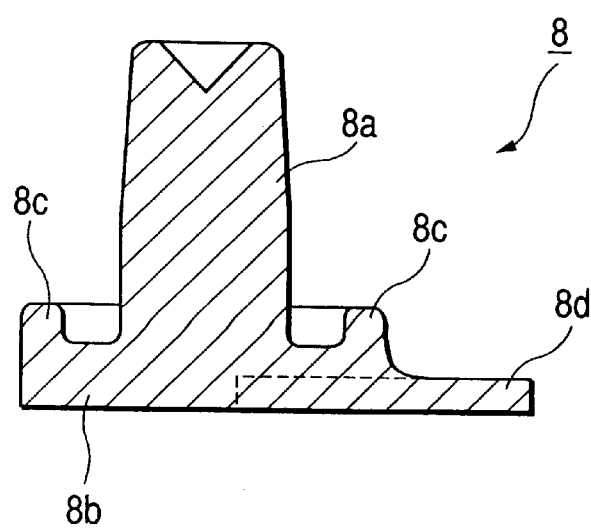

FIG. 1 is a transverse sectional view of a PSCB according to an embodiment of the present invention, FIG. 2 is a longitudinal sectional view of the PSCB, FIG. 3 is a transverse sectional view of the PSCB, FIG. 4 is an exploded perspective view of the PSCB, FIG. 5 is a side view of the PSCB, FIG. 6 is a longitudinal sectional view taken along line 6—6 in FIG. 1, FIG. 7 is a longitudinal sectional view taken along line 7—7 in FIG. 1, FIG. 8 is a longitudinal sectional view taken along line 8—8 in FIG. 1, FIG. 9 is a bottom view of a holder, FIG. 10 is a longitudinal sectional view of the holder, FIG. 11 is a plan view of the holder, FIGS. 12A, 12B, 12C and 12D are longitudinal sectional views taken along lines 12A—12A, 12B—12B, 12C—12C and 12D—12D, respectively, in FIG. 9, FIGS. 13A, 13B and 13C are a plan view, a front view and a right side view, respectively, of the holder, FIGS. 14A, 14B, 14C and 14D are a plan view, a right side view, a longitudinal sectional view and a bottom view, respectively, of a lid, FIG. 15 is an explanatory view showing a diaphragm portion of the lid on a larger scale, FIG. 16 is an explanatory view showing a safety vale portion of the lid on a larger scale, FIGS. 17A, 17B and 17C are a plan view, a front view and a right side view, respectively, showing a connected state of a rivet and a terminal portion, and FIGS. 18A and 18B are a plan view and a longitudinal sectional view, respectively, of the rivet.

In these figures, the numeral 1 denotes the PSCB embodying the present invention. The PSCB 1, which is generally rectangular as a whole, mainly comprises a terminal portion 2, an insulator (gasket) 3, a lid (negative case) 4, a holder 5, an external electrode 6, a cut-off element 7, and a rivet 8.

The terminal portion 2 is made of aluminum. As shown in FIGS. 4 and 17A to 17C, the terminal portion 2 is bent approximately at right angles and a tongue portion 2a to be welded to a tongue portion 8d of the rivet 8 is extended from one longitudinal end (the side opposite to a caulking portion) of the terminal portion 2 (the hatched area in FIG. 17 is the welded area). Numeral 2b denotes an aperture.

The insulator 3, which is formed of an insulating synthetic resin, comprises a cylindrical portion 3a for insertion therethrough of the rivet 8, the cylindrical portion 3a being formed at a position close to one end of the insulator 3, a recess 3b which permits a diaphragm portion 4c of the lid to swell inwards, vent holes 3c, 3c formed in the bottom of the recess 3b, a hole 3d for welding, generally rectangular apertures 3e, 3e for communication with a safety valve portion of the lid 4, and a positioning lug 3f.

The lid 4 is formed by an electrically conductive metallic plate such as a stainless steel plate and, as shown in FIGS. 14A to 14D, an upwardly projecting annular projection 4a is formed on an outer peripheral portion of the lid 4. In the bottom of the lid 4 are formed a hole 4b at a position close to one end of the lid bottom for insertion therethrough of the cylindrical portion 3a with the rivet 8 inserted therethrough, the diaphragm portion 4c formed thin integrally by grinding, a safety valve portion 4d formed thin in an annular shape by press working, and a positioning lug 4e.

After the diaphragm portion 4c is formed thin by grinding, it is bulged in a bowl shape inwards of the battery by press working. The diaphragm portion 4c is centrally provided with a breaking projection 4f for breaking a cut-off element 7 which is mounted above the diaphragm portion. Therefore, the diaphragm portion 4c is pressed outwards with an increase in internal pressure of a battery and performs a reversing motion as soon as the internal pressure exceeds a certain level.

As shown in FIG. 16, the safety valve portion 4d has an annular thin-walled portion 4g so that the thin-walled portion 4g is broken upon generation of an excessive internal pressure of the battery.

The holder 5 is formed of an insulating resin such as PPS and, as shown in FIG. 2, it is of a size capable of being fitted in the projection 4a of the lid 4. Near one end of the holder 5, as shown in FIGS. 9 to 11, are formed a through hole 5a for insertion therethrough of the cylindrical portion 3a with the rivet 8 inserted therethrough, a rivet connecting portion 9a for the rivet 8, the rivet connecting portion 9a being provided in a recess formed around the through hole 5a, apertures 5b, Sb with a pair of leads 9b, 9b projecting therein respectively, a pedestal portion 5c which holds an external electrode 6, an external electrode connecting portion 9c for connection with a connecting portion of the external electrode 6, a fixing portion 9d to be welded to the lid 4, an aperture 5d formed in a position corresponding to the safety valve portion 4d, and a cutout portion 5e for fitting thereof of the positioning lug 4e of the lid 4. In the lower surface of the holder 5 is formed a hole 5f for welding to which is exposed the lower surface of the external electrode connecting portion 9c. A welding tool is inserted into the hole 5f and is brought into contact with the lower surface of the external electrode connecting portion 9c of the holder 5, while a welding tool is brought from above into contact with the connecting portion 6c of the external electrode 6, to sandwich the external electrode connecting portion 9c and the connecting portion 6c. In this state, resistance welding is performed to fix the external electrode 6 to the holder 5 and make an electric connection to a lead 9b.

A space is formed on the back side of an outer periphery of the through hole 5a of the holder 5 and the back side of the connecting portion 9a is also exposed to forman exposed surface. That is, a synthetic resin, which forms the body of the holder 5, is not applied to the peripheral edge of the hole of the connecting portion 9a through which a lead 9b is inserted. Therefore, the exposed surface of the connecting portion 9a can be elastically deflected downward as shown in FIG. 2. Once the rivet 8 is caulked as in FIG. 2, there is no fear of the rivet 8 becoming loose even if there occurs a change with the lapse of time, because a force is applied to the caulked portion continually by an elastic reverting force of the connecting portion 9a.

Figure 13A:
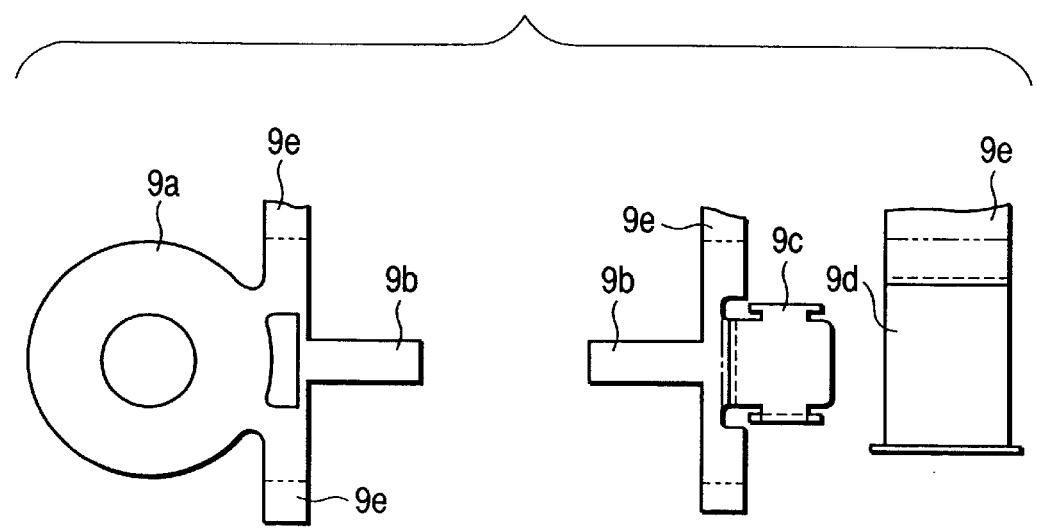
FIGS. 13A, 13B and 13C are a plan view, a front view and a right side view, respectively, of a lead of the holder.
Figure 13B:
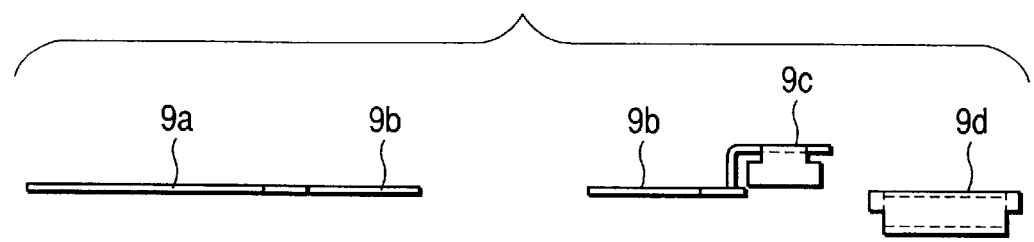
Figure 13C:
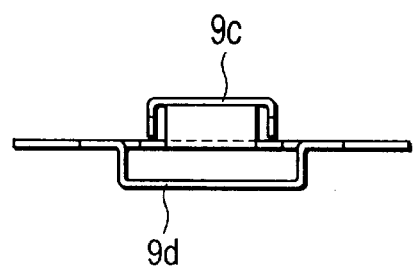
Figure 14A:
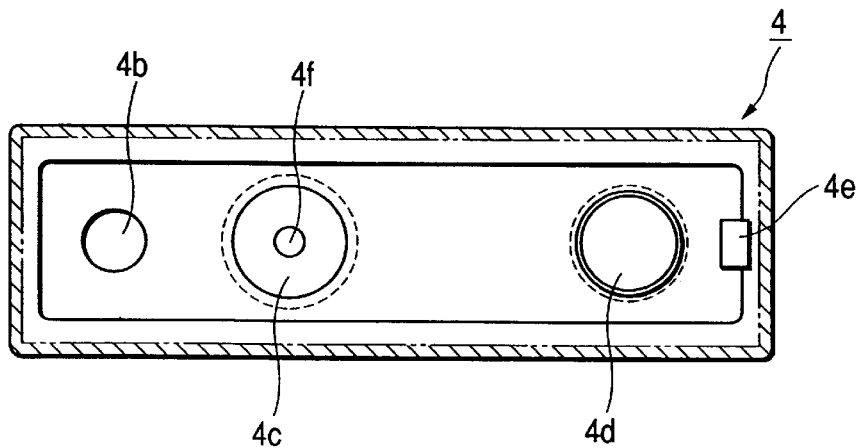
FIGS. 14A, 14B, 14C and 14D are a plan view, a right side view, a longitudinal sectional view and a bottom view, respectively, of a lid.
Figure 14B:
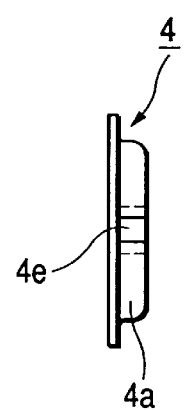
Figure 14C:
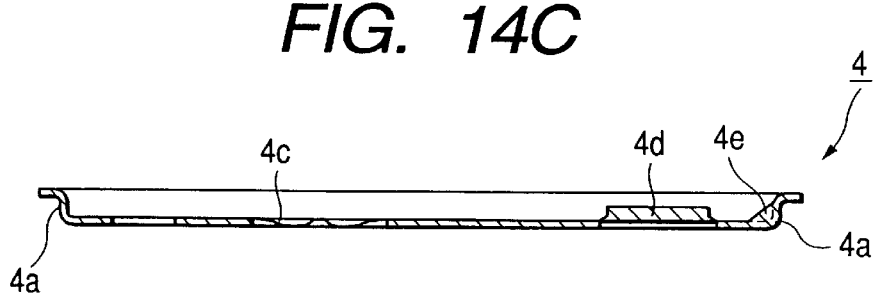
Figure 14D:
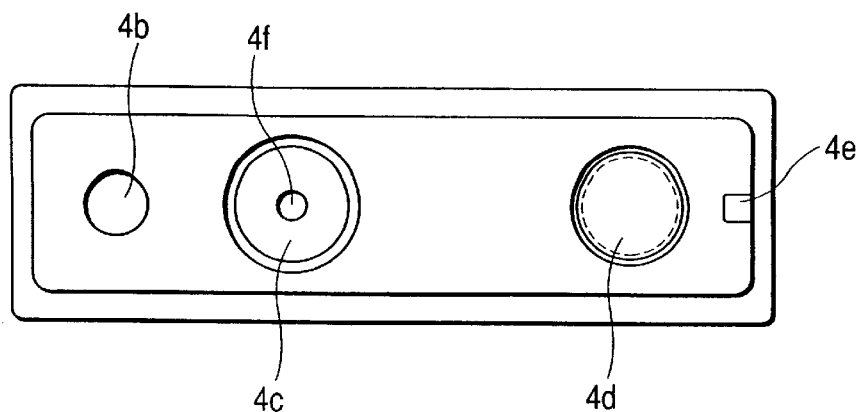

As shown in FIGS. 13A to 13C, the rivet connecting portion 9a, the paired leads 9b, 9b, the external electrode connecting portion 9c and the fixing portion 9d are initially connected in a hoop shape to a frame (not shown) through a connecting portion 9e. The hoop is formed using an electrically conductive material such as nickel. In forming the hoop, the holder 5 shown in FIGS. 9 to 11 is formed by insert molding with use of an insulating resin and thereafter the connecting portion 9e is cut at the position of dash-double dot lines. Thus, the rivet connecting portion 9a and one lead 9b are connected together. The lead is connected to the other lead 9b and the external electrode connecting portion 9c through a cut-off element 7. On the other hand, the fixing portion 9d is not electrically connected to any other component.

The holder 5 is fixed by spot-welding the fixing portion 9d to the bottom portion of the lid 4 located on the underside of the fixing portion. A welding tool for the spot welding can be brought into abutment with the bottom portion of the lid 4 from the welding hole 3d of the insulator 3 located on the lid bottom.

The cut-off element 7, which is generally in the shape of a belt, comprises an insulating ceramic or resin base plate 7a and a cut-off circuit 7b formed on the upper surface side of the base plate 7a by printing or by lamination of a metallic foil. The leads 9b, 9b of the holder 5 are connected respectively to both longitudinal ends of the cut-off circuit 7b.

The cut-off element 7 is disposed above the diaphragm portion 4c, so upon reversal of the diaphragm portion 4c with an increase in internal pressure of the battery, the cut-off circuit 7b of the cut-of f element 7 can be cut off positively by the breaking projection 4f of the diaphragm portion.

The external electrode 6 is formed from steel plated with nickel and it becomes a positive electrode of a storage battery (not shown) when the PSCB 1 is installed into the battery. The external electrode 6 comprises a generally rectangular body portion 6a, leg portions 6b, 6b bent from both side edges of the body portion 6a, and a connecting portion 6c to be welded to the connecting portion 9b of the holder 5. As shown in FIG. 6, the leg portions 6b are bent to fix the external electrode 6 to the holder 5.

The rivet 8 is formed of aluminum and, as shown in FIGS. 18A and 18B, it comprises a columnar portion 8a whose upper end portion is somewhat smaller in diameter, a flange portion 8b formed at the lower end, an annular projection 8c projecting along the outer periphery of the flange portion 8b, and a tongue portion 8d extending sideways from the outer peripheral surface of the flange portion 8b. To the tongue portion 8d is fusion-bonded the tongue portion 2a of the terminal portion 2, as noted previously. The insulator 3, lid 4 and holder 5 are made integral with one another by caulking of the rivet 8. The upper end of the columnar portion 8a of the rivet 8 is caulked and connected to the rivet connecting portion 9a of the holder 5. Consequently, the external electrode 6 is connected to the terminal portion 2 through the cut-off circuit 7b, etc.

Therefore, when the insulator 3 is put on the rivet 8 and the rivet is inserted into the columnar portion 3a of the insulator and then caulked, the annular projection 8c of the flange portion 8b bites into the lower surface of the insulator 3 to ensure a hermetic seal.

Although in the above embodiment the diaphragm portion is formed thin by grinding, it may be formed thin by press working.

The following description is now provided about a method for installing the PSCB 1 into a storage battery (a secondary lithium ion battery).

Before installation, by inserting the PSCB 1 from above into a battery case of the storage battery (not shown) and then caulking the lid 4 throughout the whole circumference of a caulking portion of the battery case, the PSCB 1 is surely installed and sealed into the storage battery.

Reference will now be made to the operation of the PSCB 1 as used in the above secondary lithium ion battery.

In the PSCB 1, while the battery is charged, an electric current flows successively from the external electrode (positive electrode) 6 to lead 9b, cut-off circuit 7b of the cut-off element 7, lead 7a, rivet 8 and terminal portion 2.

In this case, if the electric current is continued to flow even after completion of the charging, with consequent overcharging, or if the charging is performed with an electric current larger than the predetermined level of current, there will occur an abnormal condition in the storage battery (not shown) and the internal pressure and temperature of the battery will increase.

The increased internal pressure of the storage battery will be transmitted as an external pressure to the PSCB 1. As a result, as shown in FIG. 3, this external pressure acts to deflect the diaphragm portion 4c of the lid 4 upward through the vent holes 3c, 3c of the insulator 3. Then, when the increased internal pressure of the storage battery, not shown, has reached a certain level, the diaphragm portion 4c of the lid 4 reverses upward quickly and its central breaking, projection 4f pushes a nearly central part of the cut-off element 7 upward, whereby the base plate 7a of the cut-off element 7 is broken.

This breakage of the cut-off element 7 causes breakage of the cut-off circuit 7b of the cut-off element 7 and the leads 9b, 9b cease to conduct, so that the PSCB 1 cuts off the electric current flowing between the external electrode 6 and a power generating portion of the storage battery, whereby a further charging is stopped and the secondary lithium ion battery is made incapable of functioning as a storage battery.

With a further increase in internal pressure of the storage battery, the thin-walled portion 4g of the safety valve portion 4d in the lid 4 is broken, with the result that the gas present within the battery flows from the broken part of the thin-walled portion 4g of the safety valve portion 4d, passes through the PSCB 1 and is discharged from the aperture 5d. For example, the operating pressure of the PSCB 1 is set to a pressure in the range of 4 to 10 atmospheres and that of the safety valve is set to a pressure in the range of 10 to 20 atmospheres.

Thus, the PSCB of the above embodiment comprises the metallic battery lid 4 having the hole 4b, the insulator 31 formed with the cylindrical portion 3a having a bore which portion 3a is inserted into the hole 4b, the metallic rivet 8 which is inserted through the cylindrical portion 3a of the insulator 3, the insulating holder 5 having the through hole 5a into which the rivet 8 is inserted, and the electrically conductive connecting portion 9a formed around an outer surface of the through hole 5a of the holder 5 and having an exposed surface with a space formed on the backside thereof. The rivet 8 has the tongue portion 8d on the side opposite to the caulking portion and the terminal portion 2 is bonded to the tongue portion 8d. Accordingly, there is less damage to the caulking portion and improvement can be made not only in sealability but also in a long-term stability of an electrically contacted state.

In the above embodiment, moreover, since the tongue portion 8d projects in a direction parallel to the lid 4, a small thickness of the bonded portion will do and hence it is possible to save the required space.

In the above embodiment, since the flange portion 8b of the rivet 8 is formed with the annular projection 8c on its side which comes into contact with the insulator 3 as a to-be-caulked member, the annular projection 8c bites into the to-be-caulked member 3 to afford a positively sealed condition.

Further, in the above embodiment, the PSCB has the electrically conductive rivet connecting portion 9a formed around the outer surface of the through hole 5a of the holder 5 and having an exposed surface with a space present on the back side thereof, the exposed surface of the rivet connecting portion 9a being deformed toward the back-side space by caulking. Thus, a force is exerted continually on the caulked portion and hence there is no fear of loosening of the rivet even if there occurs a change with the lapse of time.

Many widely different embodiments of the invention may be constructed without departing from the spirit and the scope of'the present invention. It should be understood that the present invention is not limited to the specific embodiments described in the specification, except as defined in the appended claims.

What is claimed is:

1. A pressure sensitive circuit breaker comprising:

a lid having a diaphragm section for a battery cell and a lid through-hole;

an insulator to insulate between said lid and a power generating element, said insulator having an insulator through-hole coaxial with said lid through-hole;

a metallic rivet comprising a caulking section, a flange portion fixed to said insulator and a tongue portion extending from said flange portion and welded and connected to a terminal end of said power generating element;

an electrical conductive path disposed outside said lid and having a connection portion at one end; and an insulating holder to hold said electrical conductive path and having a holder through-hole coaxial with said lid through-hole and said insulator through-hole;

wherein said diaphragm section is deformed by an increased internal pressure of said battery cell thereby shutting off said electrical conductive path;

said metallic rivet is inserted through each of said through-holes;

said caulking section of said metallic rivet is caulked with said connection portion and electrically connected to said connection portion; and an extending length of said tongue portion of said metallic rivet is a length in which heat generated when said extending length of said tongue portion is connected by welding to said terminal end of said power generating element does not damage said flange portion and said caulking portion.

2. A pressure sensitive circuit breaker according to claim 1, wherein said tongue portion extends in a direction in parallel with said lid.

3. A pressure sensitive circuit breaker according to claim 1, wherein an annular projection is formed on a surface of said flange portion of said rivet, the surface of said flange portion being in contact with said insulator, and an annular groove engaged with said annular projection is formed on a surface of said insulator, the surface of said insulator being in contact with said flange portion of said rivet.

4. A pressure sensitive circuit breaker according to claim 1, wherein said connection portion is positioned at an outer end of said holder through-hole and has a surface extending into said holder through-hole such that said connection portion may partially cover said outer end.

* * * * *